United States Patent
Kuchenski et al.

(10) Patent No.: US 11,551,210 B2
(45) Date of Patent: Jan. 10, 2023

(54) MODULAR AUTOMATED TRANSACTION MACHINE

(71) Applicant: Diebold Nixdorf, Incorporated, North Canton, OH (US)

(72) Inventors: David Kuchenski, Uniontown, OH (US); Richard Harris, North Canton, OH (US)

(73) Assignee: Diebold Nixdorf Incorporated, Hudson, OH (US)

( * ) Notice: Subject to any disclaimer, the term of this patent is extended or adjusted under 35 U.S.C. 154(b) by 384 days.

(21) Appl. No.: 16/855,464

(22) Filed: Apr. 22, 2020

(65) Prior Publication Data
US 2020/0250640 A1 Aug. 6, 2020

Related U.S. Application Data

(63) Continuation-in-part of application No. PCT/US2018/057021, filed on Oct. 23, 2018.
(Continued)

(51) Int. Cl.
*G06Q 20/38* (2012.01)
*G06Q 20/10* (2012.01)
(Continued)

(52) U.S. Cl.
CPC .......... *G06Q 20/383* (2013.01); *E05G 1/024* (2013.01); *G06K 7/10297* (2013.01);
(Continued)

(58) Field of Classification Search
CPC ...... G07F 19/20; G07F 19/205; G07F 19/201; G07F 19/208; G07F 17/3202;
(Continued)

(56) References Cited

U.S. PATENT DOCUMENTS 10,096,212 B1 * 10/2018 Lee .................. G07F 19/202
2002/0000913 A1 1/2002 Hamamoto
(Continued)

FOREIGN PATENT DOCUMENTS

| EP | 1926058 A2 | 5/2008 |
| WO | 2007036915 A2 | 4/2007 |

OTHER PUBLICATIONS

Adi Lakshmi Satya Sri et al., IEEE.com, "Design of Automatic 5 × 5 Dispenser with three kinds of payment modes using Verilog HDL", 2020, all pages.*
(Continued)

*Primary Examiner* — Thien T Mai
(74) *Attorney, Agent, or Firm* — Black McCuskey

(57) ABSTRACT

An automated transaction machine can include a user-interface device, a computing device, a battery, a head portion, a first socket-half, a first electrical rail, and a relay. The a user-interface device can be configured to receive an input from a user and transmit the input. The computing device can receive the input. The battery can selectively direct electric power to the user-interface device and the computing device, which can all be housed in the head portion. The first socket-half can be exposed on an outside surface of the head portion and direct power to the user-interface device, the computing device, and the battery. The relay can be arranged to connect the battery and the first electrical rail in a first configuration and be switched between the first configuration and the second configuration by an output signal of the first socket-half.

19 Claims, 10 Drawing Sheets

Related U.S. Application Data

(60) Provisional application No. 62/576,055, filed on Oct. 23, 2017.

(51) Int. Cl.
| | |
|---|---|
| *G07F 19/00* | (2006.01) |
| *G07D 11/40* | (2019.01) |
| *G06K 7/10* | (2006.01) |
| *H02J 7/00* | (2006.01) |
| *E05G 1/024* | (2006.01) |
| *G07F 17/12* | (2006.01) |
| *G07D 11/60* | (2019.01) |

(52) U.S. Cl.
CPC ......... *G06Q 20/1085* (2013.01); *G07D 11/40* (2019.01); *G07D 11/60* (2019.01); *G07F 17/12* (2013.01); *G07F 17/13* (2020.05); *G07F 19/201* (2013.01); *G07F 19/208* (2013.01); *H02J 7/0042* (2013.01); *G07F 19/205* (2013.01)

(58) Field of Classification Search
CPC ............. G07F 17/3206; G07F 17/3204; G07F 17/12; G07F 17/13; G07F 9/06; G07F 9/10; G07F 1/041; G07F 11/14; G07F 11/44; G07D 11/40; G07D 11/12; G07D 11/60; G07D 2211/00; G07D 11/18; G07D 11/125; G06Q 20/383; G06Q 20/1085; E05G 1/024; E05G 2700/02; E05G 1/04; E05B 65/0075; G06K 7/10297; G06K 19/041; H02J 7/0042; H02J 7/0045

See application file for complete search history.

(56) References Cited

U.S. PATENT DOCUMENTS

| | | | |
|---|---|---|---|
| 2004/0149818 A1 | 8/2004 | Shepley | |
| 2005/0109832 A1 | 5/2005 | Izawa | |
| 2012/0001524 A1 | 1/2012 | Shih | |
| 2012/0145782 A1* | 6/2012 | Ma | G07F 19/209 235/379 |
| 2016/0099590 A1* | 4/2016 | Velderman | H02J 7/0027 320/113 |
| 2016/0197504 A1* | 7/2016 | Hsia | H02J 7/342 307/66 |
| 2016/0300205 A1* | 10/2016 | Lute | G07F 19/205 |

OTHER PUBLICATIONS

Bernardo Batiz-Lazo et al., IEEE.com, "Evidence from the Patent Record on the Development of Cash Dispensing Technology", 2008, all pages.*

Diebold Nixdorf: "Diebold Nixdorf Expands Offerings Beyond Omnichannel, Reveals Connected Commerce Future at Money 20/20" Oct. 17, 2017, XP055552152, Retrieved from the Internet: URL: https://www.pmewswire.com/news-releases/diebold-nixdorf-expands-offerings-beyond-omnichannel-reveals-connected-commerce-future-at-money2020-300537845.html [retrieved on Feb. 5, 2019]; the whole document.

Anonymous: "Santo Tirso Lamassu", Nov. 15, 2016, XP055552129, Retrieved from the Internet: URL: https://web.archive.org/web/20161115030956/https://lamassu.is/product/santo-tirso/ {retreived on Feb. 5, 2019] the whole document.

Author International Searching Authority, Patent Cooperation Treaty; Title: International Search Report; dated Feb. 20, 2019 All pages; International application No. PCT/US2018/057167 (corresponding to the present application).

Author International Searching Authority, Patent Cooperation Treaty; Title: Written Opinion of the International Searching Authority; dated Feb. 20, 2019 All pages; International application No. PCT/US2018/057167 (corresponding to the present application).

Author International Searching Authority, Patent Cooperation Treaty; Title: Written Opinion of the International Searching Authority; dated Oct. 30, 2019; All pages; International application No. PCTUS2019/042691 (also corresponding to the present application).

Author International Searching Authority, Patent Cooperation Treaty; Title: International Search Report; dated Mar. 7, 2019; All pages; International application No. PCT/US2018/057027 (also corresponding to the present application).

The Hivemq Team: "MQTT Essentials Part 3: Client, Broker and Connection Establishment", Jan. 26, 2015, XP0555560454, Retrieved from the Internet: URL: https://hivemq.com/blog/mqtt-essentials-part-3-client-broker-connections-establishment/ [retrieved on Feb. 21, 2019] the whole document.

Author International Searching Authority, Patent Cooperation Treaty; Title: Written Opinion of the International Searching Authority; dated Oct. 23, 2018; All pages; International application No. PCT/US2018/057021 (also corresponding to the present application).

Author International Searching Authority, Patent Cooperation Treaty; Title: International Search Report dated Oct. 30, 2019; All pages; International application No. PCTUS2019/042691 corresponding to the present application).

* cited by examiner

MODULAR AUTOMATED TRANSACTION MACHINE

CROSS-REFERENCE TO RELATED APPLICATIONS

This application claims the benefit of U.S. Provisional Patent Application Ser. No. 62/576,055 for a MODULAR ATM, filed on Oct. 23, 2017, which is hereby incorporated by reference in its entirety. In addition, this is a bypass application of PCT/US18/057021, filed Oct. 23, 2018.

BACKGROUND

1. Field

The present disclosure relates to automated transaction machines (ATMs).

2. Description of Related Prior Art

Banking transactions requested by a customer may be processed in different ways. For example, a banking customer may visit a teller and the teller may process the banking transaction. Alternatively, the customer may use an ATM to process a banking transaction.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An automated transaction machine (ATM) can include at least one user-interface device, at least one computing device, a battery, a head portion, a first socket-half, a first electrical rail, and a relay. The at least one user-interface device can be configured to receive an input from a user. The input can correspond at least in part to an account maintained by a financial institution. The at least one user-interface device can be configured to transmit the input. The at least one user-interface device can be further defined as one of a key pad, a display, a scanner, a near field communication (NFC) transceiver, and a card reader. The at least one computing device can be in data communication with the at least one user-interface device to receive the input. The battery can be selectively connectable to the at least one user-interface device and to the at least one computing device to direct electric power when connected to the at least one user-interface device and to the at least one computing device. The at least one user-interface device and the at least one computing device and the battery can be housed in the head portion. The first socket-half can be fixedly mounted in the head portion, exposed on an outside surface of the head portion. The first socket-half can be electrically connected to the at least one user-interface device and to the at least one computing device and to the battery to direct electric power when connected to the at least one user-interface device and to the at least one computing device and to the battery. The first electrical rail can be housed in the head portion. The at least one user-interface device can receive power off of the first electrical rail. The relay can communicate with the first socket-half and can also be disposed between the battery and the first electrical rail. The relay can be arranged such that the relay connects the battery and the first electrical rail in a first configuration and, in a second configuration, selectively switches the battery off of the first electrical rail. The relay is switched between the first configuration and the second configuration by an output signal of the first socket-half.

According to other features, the battery charger circuit can be disposed between the relay and the first socket-half, wherein the battery charger circuit is connected to the battery when the relay is in the second configuration. The first socket-half can be directly connected to the first electrical rail. The first socket-half can be directly connected to the battery charger circuit as well as the relay.

In other features, the ATM can also include a second electrical rail housed in the head portion. The ATM can also include a first circuit assembly housed in the head portion. The first circuit assembly can be disposed between the first electrical rail and the second electrical rail. The first circuit assembly can convert a first level of voltage on the first electrical rail to a second level of voltage different from the first level of voltage and communicating the second level of voltage to the second electrical rail. The first level of voltage can be less than the second level of voltage.

According to additional features, the ATM can also include a third electrical rail housed in the head portion. The ATM can also include a second circuit assembly housed in the head portion and disposed between the first electrical rail and the third electrical rail. The second circuit assembly can convert the first level of voltage on the first electrical rail to a third level of voltage different from the first level of voltage and communicate the third level of voltage to the third electrical rail. The first level of voltage can be greater than the third level of voltage. The ATM can also include a capacitor housed in the head portion connected to the first electrical rail and configured to direct electrical power to the first electrical rail when power from either of the battery or the first socket-half is lost.

According to other features, the ATM can also include a base portion, a safe, an advanced function dispenser (AFD), a second socket-half, and a power management module. The base portion can be selectively engageable with the head portion and defining an output slot. The head portion can rest on the base portion when the base portion and the head portion are engaged together. The safe can be housed in the base portion. The AFD can be housed in the base portion and can be configured to extract banknotes from the safe and direct the banknotes through the output slot. The second socket-half can be fixedly mounted in the base portion. The first socket-half and the second socket-half can directly mate as the base portion and the head portion are brought into engagement with one another. The power management module can be housed in the base portion and can be configured to receive grid electrical power from the grid, direct grid electrical power through the base portion, convert grid electrical power from AC to DC, and direct DC power to the head portion through the first socket-half and second socket-half.

In other features, the AFD can communicate data with the at least one computing device through the first socket-half and the second socket-half. The first socket-half and the second socket-half can be configured to transmit power and data between the base portion and the head portion. The base portion can be configured to receive power from the grid and direct power to the head portion through the first socket-half and second socket-half.

According to additional features, the base portion can define a shelf sized to receive a bottom of the head portion.

The head portion can rest on the shelf when the first socket-half and the second socket-half are mated. At least one post can project away from the shelf and can be received in at least one slot defined in the bottom of the head portion when the head portion is placed on the shelf. The head portion can be configured to be moved deeper into the shelf, towards a back wall of the shelf, while the at least one post is positioned in the at least one slot.

According to other features, the first socket-half can be mounted in the head portion and can face the back wall of the base portion and is moved deeper into the shelf. The second socket-half can be mounted in the back wall. The first socket-half and the second socket-half can directly mate when movement of the head portion deeper into the shelf is stopped by engagement between the at least one post and the at least one slot, precluding damage to the first socket-half and the second socket-half by preventing over-engagement between the first socket-half and the second socket-half.

In other features, the ATM can also include one or more blades, one or more slots, and one or more locks. The one or more blades can extend from the head portion. The one or more slots can be defined in the back wall of the base portion. Each of the one or more slots can be configured to receive the one or more blades. The one or more locks can be mounted in the base portion. Each of the one or more locks can be configured to receive a key to convert from an unlocked configuration to a locked configuration and from the locked configuration to the unlocked configuration. The one or more blades can be received in the one or more slots when the head portion is moved deeper into the shelf, against the back wall. After the one or more blades is received in the one or more slots, the one or more locks can be engaged to lock the one or more blades in the one or more slots.

According to additional features, the ATM can be operated by lowering the head portion onto the base portion. The head portion can be positioned on the shelf of the base portion and slid across the shelf until the first socket-half mates with the second socket-half. During these actions, the first level of voltage on the first electrical rail can be maintained with the battery. After the sliding, the computing device and the AFD can be placed in communication with one another through the mated first and second socket-halves. The communications between the computing device and the AFD can occur by way of a publish/subscribe protocol. The computing device 34 can run a terminal service for the AFD wherein the terminal service can receive data from the AFD after the placing action and can also generate a message containing the received data, wherein a format of the received data is changed by the terminal service to the publish/subscribe protocol.

BRIEF DESCRIPTION OF THE DRAWINGS

The detailed description set forth below references the following drawings.

DETAILED DESCRIPTION

The present disclosure, as demonstrated by the exemplary embodiment described below, can provide an ATM that is modular in a plurality of different ways. For example, the exemplary modular ATM includes a power management system that allows peripherals of the ATM to be replaced without powering down other peripherals. Also, a plurality of peripherals can be group together in a head portion with a battery, so that these peripherals can be powered by the battery during periods away from the grid. Further, the exemplary modular ATM applies a publish/subscribe communication architecture that allows peripherals to be changed with the need to recompile or alter programing of other components of the ATM.

Figure 1:
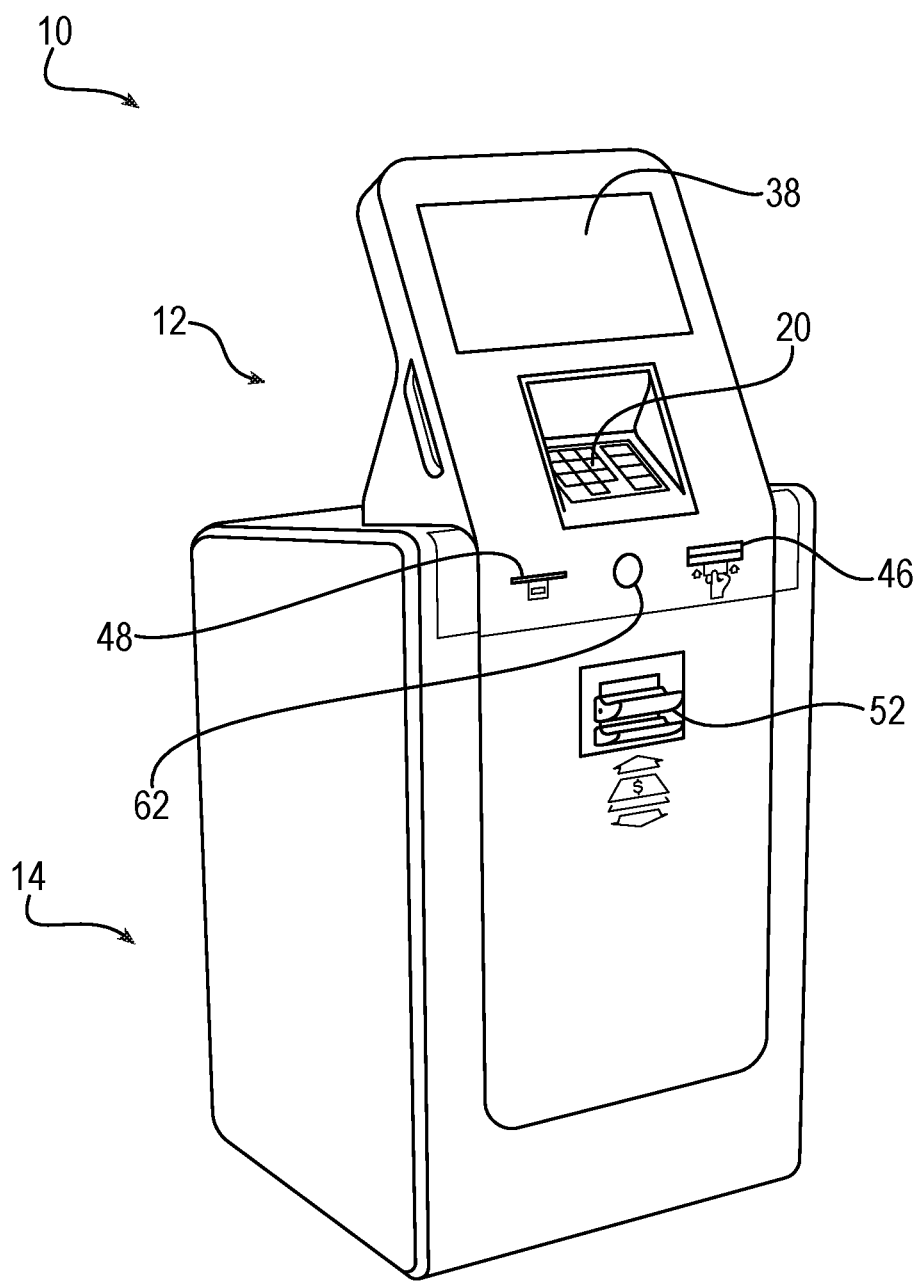
FIG. 1 is a perspective view of a modular ATM according to an exemplary embodiment of the present disclosure.

Referring now to the drawings, FIG. 1 discloses an exemplary modular ATM 10 according to one or more implementations of the present disclosure. The modular ATM 10 includes a head portion 12 and a base portion 14. The head portion 12 and the base portion 14 can collectively define a housing for components and subsystems of the exemplary modular ATM 10. The exemplary head portion 12 and the exemplary base portion 14 house internal components and subsystems. The exemplary base portion 14 is configured to receive power from the grid and direct power to the head portion 12, as set forth in greater detail below. The internal components and subsystems of the exemplary head portion 12 and the exemplary base portion 14 are set forth in greater detail below.

Figure 2:
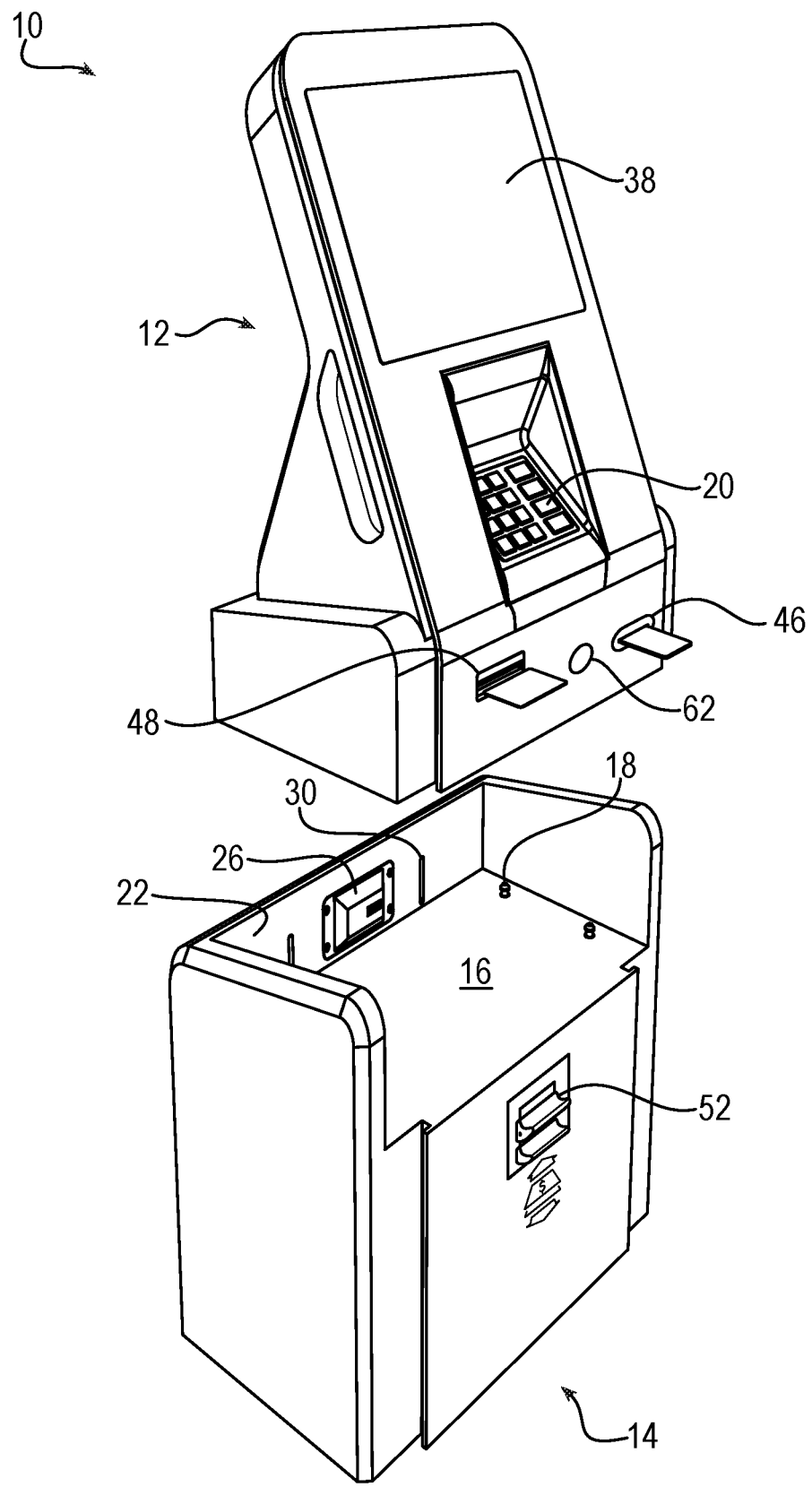
FIG. 2 is a first partially-exploded view of the modular ATM according to the exemplary embodiment of the present disclosure.
Figure 3:
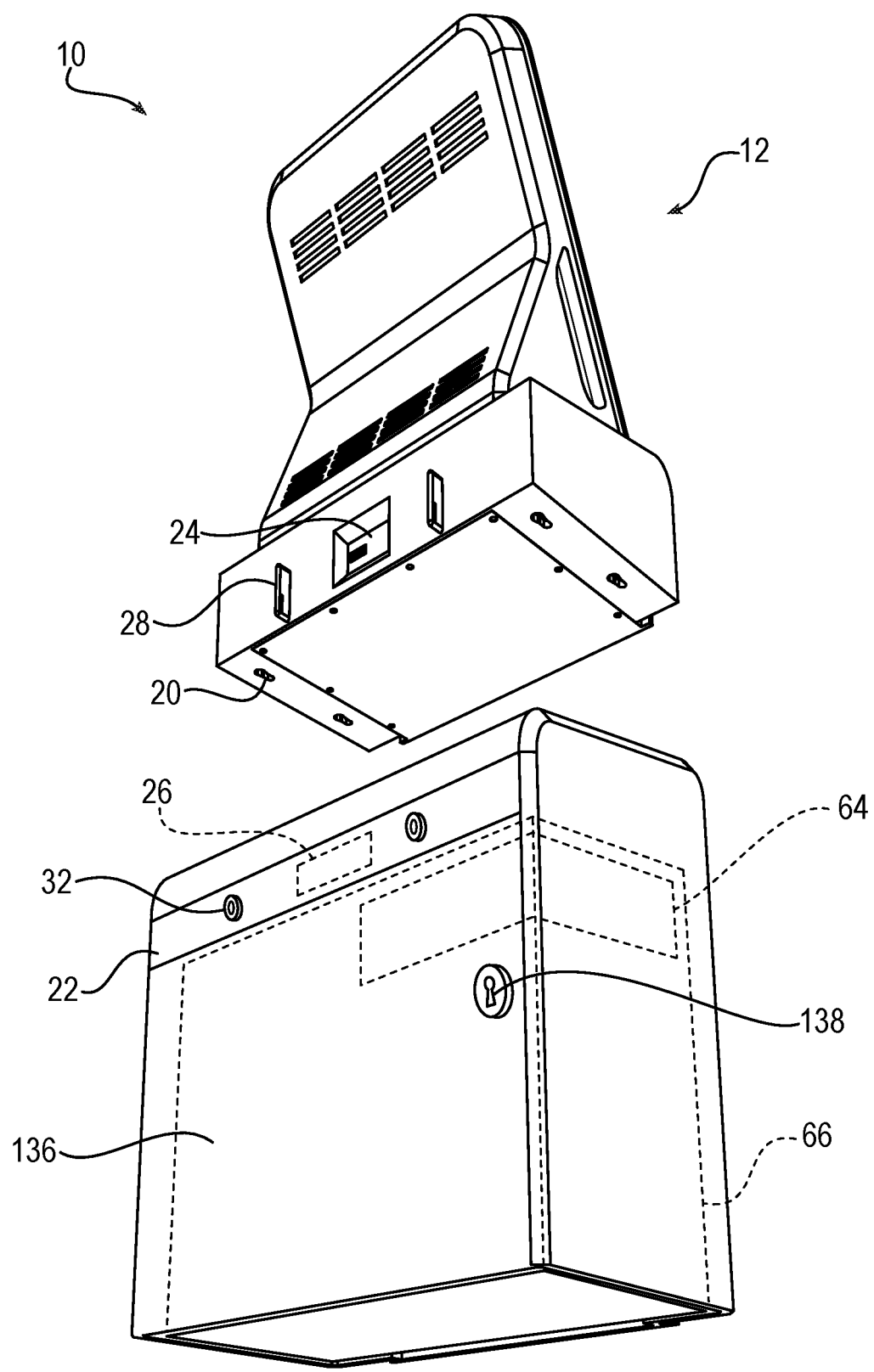
FIG. 3 is a second partially-exploded view of the modular ATM according to the exemplary embodiment of the present disclosure.

As best shown in FIGS. 2 and 3, the exemplary base portion 14 defines a shelf 16 sized to receive a bottom of the exemplary head portion 12. The exemplary head portion 12 can rest on the shelf 16. Posts, such as post 18, can project away from the shelf 16. Each of the exemplary posts 18 can be received in a slot, such as slot 20, defined in the bottom of the exemplary head portion 12. The exemplary posts 18 can be shaped to include a relatively wider head and relatively narrow body. The exemplary slots 20 can be keyed such that a first portion of the slot is relatively wider to receive the head of one of the posts 18 and a second portion of the slot is relatively narrow, sized similarly to the relatively narrow body of the post 18. In operation, the head portion 12 can be lowered onto the shelf 16 so that each of the heads of the posts 18 is received in the relatively wider portion of one of the slots 20. Then, the head portion 12 can be moved deeper into the shelf 16, towards a back wall 22 of the shelf 16, whereby the heads of the posts 18 are captured by the narrow portions of the slots 20, precluding the head portion 12 from being lifted relative to the base portion 14. Also, the first socket-half 24 and the second socket-half 26 can directly mate when movement of the head portion 12 deeper into the shelf 16 is stopped by engagement between the at least one post 18 and the at least one slot 20, precluding damage to the first socket-half 24 and the second socket-half 26 by preventing over-engagement between the first socket-half and the second socket-half.

Mating plugs/sockets (socket-halves forming a socket pair) can be mounted in the shelf 16 and in the back of the head portion 12. The exemplary head portion 12 includes a first half 24 of a socket pair. The exemplary socket-half 24 is mounted to the head portion 12 and is exposed on an outside surface of the head portion 12. The exemplary socket-half 24 is selectively connectable to the user-interface devices and to the computing device 34 and to the battery 76, to direct electric power when connected to the user-interface devices and to the computing device 34 and to the battery 76. A second half 26 of the socket pair is mounted in the back wall 22 of the shelf 16 of the base portion 14. In the exemplary embodiment, the first half 24 and the second half 26 directly mate when the head portion 12 is moved deeper into the shelf 16, against the back wall 22. The socket pair can define a plurality of distinct connections when mated together. In operation, data and power signals can be communicated through the socket pair 24, 26, between the internal components and subsystems of the exemplary head portion 12 and the exemplary base portion 14.

The exemplary head portion 12 and the exemplary base portion 14 can also include structures to enhance security of interconnection. For example, the exemplary head portion 12 can include one or more blades, such as blade 28. The exemplary base portion 14 can include a slot, such as slot 30, to receive each blade. The exemplary base portion 14 can further include a lock at each slot, such as lock 32. The exemplary lock 32 can receive a key to convert from an unlocked configuration to a locked configuration, and from the locked configuration to the unlocked configuration. In the exemplary embodiment, the blade 28 is received in the slot 30 when the head portion 12 is moved deeper into the shelf 16, against the back wall 22. After the blade 28 is received in the slot 30, the lock 32 can be engaged to lock the blade 28 in the slot 30.

Figure 4:
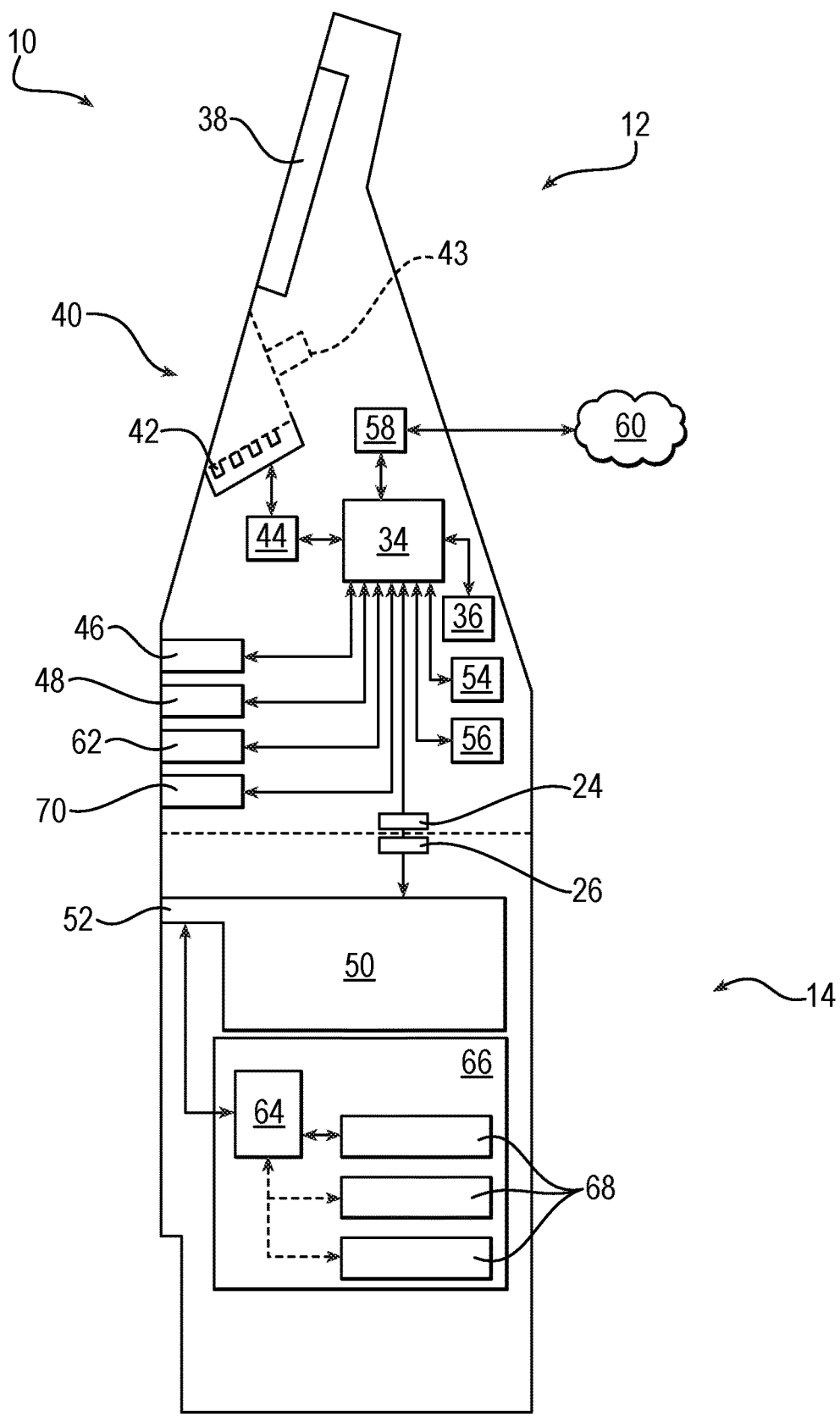
FIG. 4 is a first functional block diagram of the exemplary modular ATM.

FIG. 4 discloses a functional block diagram of the exemplary modular ATM 10 according to one or more implementations of the present disclosure. The modular ATM 10 includes different structures and subsystems for receiving input from a user and executing transactions. A dashed line is shown in FIG. 4 to delineate the components of the head portion 12 in the exemplary embodiment and the components of the base portion 14.

The modular ATM 10 includes a computing device 34. The exemplary computing device 34 has one or more processors and a non-transitory, computer readable medium. The computing device 34 operates under the control of an operating system, kernel and/or firmware and executes or otherwise relies upon various computer software applications, components, programs, objects, modules, data structures, etc. The computer readable medium (memory) of the computing device 34 can include random access memory (RAM) devices comprising the main storage of computing device 34, as well as any supplemental levels of memory, e.g., cache memories, non-volatile or backup memories (e.g., programmable or flash memories), read-only memories, etc. In addition, the memory may be considered to include memory storage physically located elsewhere in computing device 34, such as any cache memory in a processor, as well as any storage capacity used as a virtual memory. The computing device 34 can also include one or more mass storage devices, e.g., a floppy or other removable disk drive, a hard disk drive, a direct access storage device (DASD), an optical drive (e.g., a CD drive, a DVD drive, etc.), and/or a tape drive, among others, represented by memory 36.

The exemplary modular ATM 10 also includes a display 38. The computing device 34 can control the display 38 to present information to the user for furthering completion of the transaction. The display 38 can be a touch screen that allows the user to enter information through the display 38. The exemplary display 38 is configured to transmit any user-entered information to the computing device 34.

The exemplary modular ATM 10 also includes a key pad 40 and an encryption module 44. Generally, the combination of a key pad and an encryption module are referred to in the art as an encrypted pin pad (EPP). The exemplary key pad 40 includes a plurality of keys, such as key 42. The exemplary encryption module 44 has one or more processors and a non-transitory, computer readable medium. The user can press the keys of the key pad 40 to enter a pin. The key pad 40 is placed in communication with the encryption module 44 and therefore the numbers of the pin are received by the encryption module 44. It is noted that the communication of the pin is direct and secure; the pin cannot be intercepted between the key pad 40 and the encryption module 44. The pin is then encrypted by the encryption module 44 to define a pin block. The encryption module 44 includes a network encryption key and applies the network encryption key to encrypt the pin to the pin block. The exemplary encryption module 44 is configured to transmit the pin block to the computing device 34, which can direct the pin block away from the modular ATM 10 during completion of a financial transaction. The exemplary modular ATM 10 also includes a light 43 positioned to direct light at the keys 42. Although a line is not shown between the light 43 and the computing device 34 in FIG. 4, the exemplary light 43 is controlled by the computing device 34.

The exemplary modular ATM 10 also includes a card reader 46. The card reader 46 can receive a token from the user, such as a card. The card reader 46 can read data on a magnetic strip on the back of a card and/or can read data from a chip embedded in the card. The card reader 46 can be configured to execute read and write operations with respect to any storage medium fixed to the user's card. The exemplary card reader 46 is configured to transmit any data read from the user's card to the computing device 34, which can direct the data read from the card away from the modular ATM 10 during completion of a financial transaction. The exemplary card reader 46 can also be configured to receive commands and data from the computing device 34 and change data stored on the user's card.

The exemplary modular ATM 10 also includes a printer module 48. The computing device 34 can control the printer module 48 to print a receipt when a transaction has been completed. The printer module 48 can communicate one or more messages to the computing device 34, such as a maintenance message regarding the need to refill printer paper.

The exemplary modular ATM 10 also includes an article exchange unit 50. In the exemplary embodiment, the article exchange unit 50 is configured to receive items such as checks. An exemplary article exchange unit 50 can include a drum on which received items are stored. The article exchange unit 50 can be a recycler. The exemplary article exchange unit 50 includes a slot 52 defined on an exterior of the modular ATM 10 for the passage of such items. In other embodiments of the present disclosure, an article exchange unit can be configured to facilitate the receive other items. The article exchange unit 50 can include one or more sensors and transmit signals from any such sensors to the computing device 34 to execute an exchange. The computing device 34 can control the article exchange unit 50 in response to such signals. For example, the article exchange unit 50 can include a sensor that detects receipt of an item such as a check. The article exchange unit 50 can include a further sensor in the form of a scanner that generates an image of the received item and transmits the image to the computing device 34. When an exchange involves the dispensation of an article to the user, the computing device 34 can control the article exchange unit 50 to dispense the item(s) requested by the user.

The exemplary modular ATM 10 also includes a printer module 54. The printer module 54 can generate a continuous record of all transactions executed by the modular ATM 10. The computing device 34 can control the printer module 54 to supplement the record after each transaction has been completed. The printer module 54 can communicate one or more messages to the computing device 34, such as a maintenance message regarding the need to refill printer paper.

The exemplary modular ATM 10 also includes an access module 56. The access module 56 can be positioned proximate to a rear side of the modular ATM 10. The access module 56 can be utilized for service and support technicians. For example, the access module 56 can be utilized by a field engineer to complete software updates to the computing device 34. The access module 56 can also be utilized when non-software updates and maintenance is performed, such as the refilling of printer paper or currency.

The exemplary modular ATM 10 also includes a transceiver 58. The exemplary transceiver 58 is configured to facilitate communication between the computing device 34 and other computing devices that are distinct from and physically remote from the computing device 34. An example of such a remote computing device is a server computing device, such as a banking or financial institution server communicating with a plurality of ATMs. The exemplary transceiver 58 places the computing device 34 in communication with one or more networks, such as network 60. The network 60 can be a local area network (LAN), a wide area network (WAN) such as the Internet, a Multiprotocol label switching (MPLS) network, a cellular network such as operated by cellular phone companies, or any combination thereof. The transceiver 58 can transmit data and requests for input generated by the computing device 34 and receive responses to these requests, directing these responses to the computing device 34.

The exemplary modular ATM 10 also includes a transceiver 62. The exemplary transceiver 62 is configured to facilitate communication between at least one of the encryption module 44 and the computing device 34 and other computing devices that are distinct from and physically proximate to the modular ATM 10. An example of such a proximate computing device is a smartphone possessed by the user. The dashed connection lines in FIG. 1 represent optional interconnections. The exemplary transceiver 62 can place the user's smartphone in communication with the encryption module 44, the computing device 34, or both. The exemplary transceiver 62 can implement various communication protocols. For example, the transceiver 62 can be a Near Field Communication (NFC) device. Alternatively, the transceiver 62 can be a Bluetooth beacon. The transceiver 62 can transmit and receive data and requests for input generated by the encryption module 44 and/or the computing device 34, such transmissions occurring with the user's smart phone for example.

The exemplary modular ATM 10 also includes an advanced function dispenser (AFD) 64. The AFD 64 can dispense banknotes, such as currency. The exemplary AFD 64 is positioned in a safe 66. The exemplary base portion 14 includes a rear door 136 that can be selectively opened to reload the safe 66 with notes of value. The exemplary base portion 14 also includes a lock 138 to lock the rear door 136 as desired. One or more cassettes or cash boxes 68 are also positioned and protected in the safe 66. Banknotes are stored in the cassettes 68 for disbursement to a user of the modular ATM 10. The exemplary AFD 64 can extract the banknotes from one or more of the cassettes 68 and direct them out of the modular ATM 10 through the slot 52. The AFD 64 thus communicates with the slot 52 in parallel with the article exchange unit 50. The exemplary AFD 64 can communicate with and be controlled by the computing device 34 (this is not illustrated in FIG. 4 due to the number of components already shown). The exemplary AFD 64 communicates with the computing device 34 through the socket-half 24 and the second socket-half 26. Each of the cassettes 68 can engage the AFD 64 through a rack whereby the positioning of the cassettes 68 is controlled. Further, the each of the cassettes 68 and the AFD 64 can include mating mechanical connectors of any form, whereby a positive mechanical interconnection is confirmed electronically. When one or more of the cassettes 68 and the AFD 64 are not properly interconnected, a signal or lack thereof can be communicated to the computing device 34 whereby an error message is generated, or the modular ATM 10 can be disabled.

The exemplary modular ATM 10 also includes a scanner 70. The scanner 70 can scan, for example, at least a portion of a display of a smart phone and communicate the scanned display to the computing device 34. A token can be displayed on the display of the smart phone and thus scanned by the scanner 70. The token can be a bar code, a quick response (QR) code, a number, a string of alphanumeric characters, a weblink, or some other symbolic indicia. The exemplary scanner 70 is configured to transmit any scanned data to the computing device 34, which can direct the scanned away from the modular ATM 10 during completion of a financial transaction.

Figure 5:
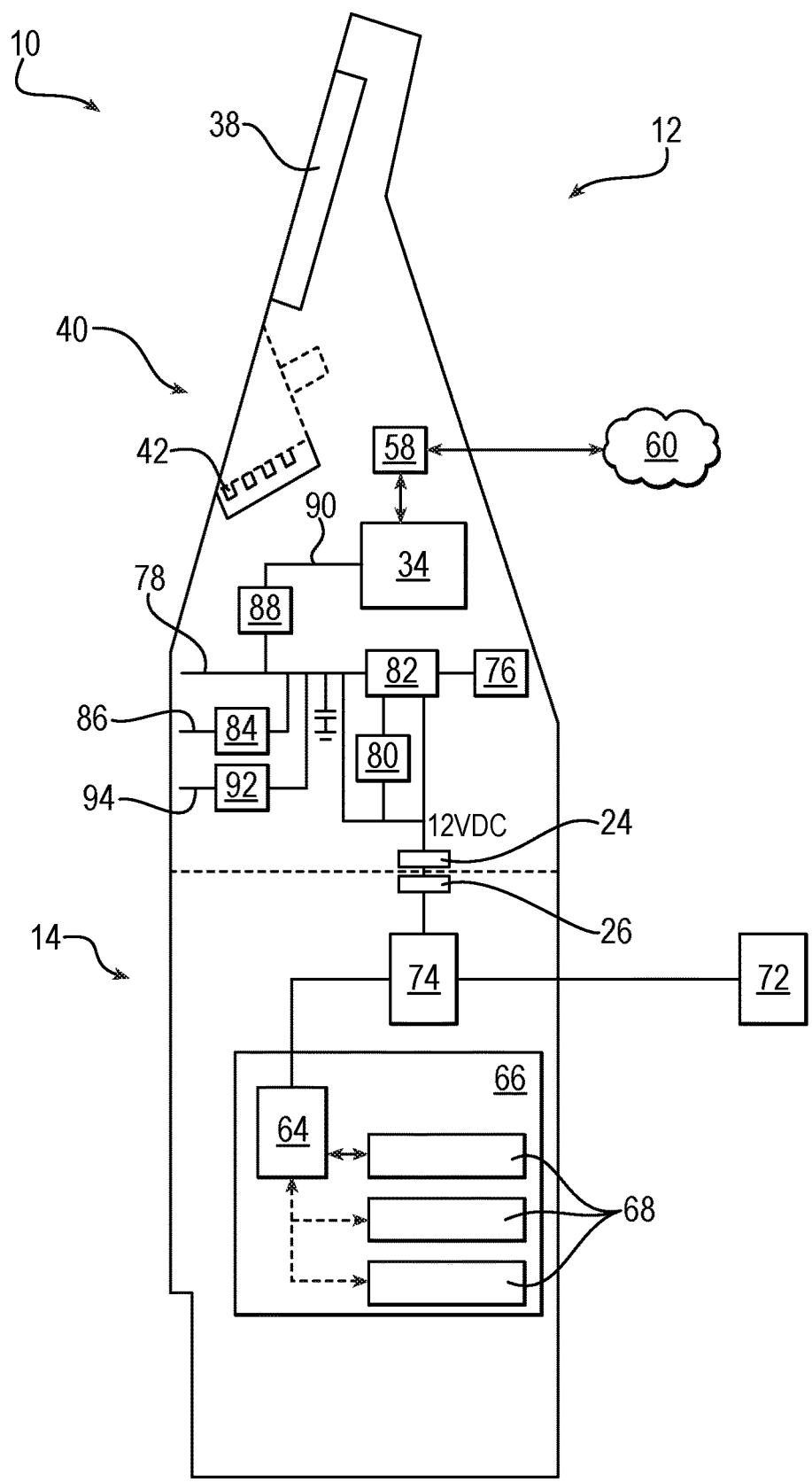
FIG. 5 is a second functional block diagram of the exemplary modular ATM.

FIG. 5 is a second functional block diagram of the exemplary modular ATM 10. FIG. 5 is provided to illustrate a power management arrangement of the exemplary modular ATM 10. The base portion 14 can receive power from the grid 72. The base portion 14 can include a power management module 74. The power management module 74 can direct power from the grid 72 to the subsystems and components within the base portion 14. The AFD 64 is one example of a component of the base portion 14. The power management module 74 can also convert power received from the grid 72 as desired for the head portion 12. The power management module 74 can convert power from AC to DC and can direct DC power to the head portion 12 through the socket-half 24 and second socket-half 26. For example, in the exemplary embodiment, the power management module 74 delivers 12 VDC to the head portion through the socket pair 24, 26.

A battery 76 is provided in the exemplary head portion 12 to power the subsystems and components within the head portion 12 when power is not supplied from the base portion 14, such as during transport. The battery 76 can provide 12 VDC. In one or more embodiments of the present disclosure, the battery 76 can provide ten minutes of power to the subsystems and components within the head portion 12. The battery 76 can provide electrical power to a 12 VDC rail, referenced at 78, when power is not supplied from the base portion 14. One or more of the user-interface devices receives power off of the first rail 78. In the exemplary embodiment, the display 38 and the printer module 48 receive power off of the first rail 78. The exemplary socket-half 24 is directly connected to the first rail 78 so that power can be supplied to the rail from the base portion 14 when the head portion 12 and base portion 14 are interconnected.

When the exemplary head portion 12 and the exemplary base portion 14 are interconnected, the 12 VDC power from the base portion 14 is directed to the rail 78, to a battery charger circuit 80, and to a relay 82. The battery charger circuit 80 is also connected to the relay 82, as shown in FIG. 5. The exemplary socket-half 24 is directly connected to the battery charger circuit 80 is also to the relay 82. The exemplary battery charger circuit 80 is disposed between the relay 82 and the socket-half 24. The relay 82 is disposed between the battery 76 and the first rail 78. The relay 82 is arranged such that the relay 82 connects the battery 76 and the first rail 78 in a first configuration and in a second configuration selectively switches the battery 76 off of the first rail 78. The relay 82 is switched from the first configuration to the second configuration when electrical power is available at the socket-half 24, which defines the output signal of the socket-half 24. Thus, the battery charger circuit 80 is connected to the battery 76 when the relay 82 is in the second configuration.

The battery 76 delivers power to the 12 VDC rail 78 if power is not supplied from the base portion 14. When power is supplied from the base portion 14, the relay 82 is switched, connecting the battery 76 and the battery charger circuit 80 and isolating the battery 76 from the rail 78, so that the battery 76 can be charged. The battery 76 allows the various devices, subsystems, and components within the head portion 12 to be changed without the loss of power to the other devices, subsystems, and components. The battery 76 is thus selectively connectable to the user-interface devices and to the computing device 34. An appropriately-sized capacitor is positioned on the rail 78 so that power is maintained on the rail 78 during the switch of power source between the battery 76 and the base portion 14. An exemplary capacitor is referenced in FIG. 6 at 96. The exemplary capacitor 96 is connected to the user-interface devices and to the computing device 34 and to the battery 76, through the rail 78. The capacitor 96 is loaded by the battery 76 initially and directs electric power to the user-interface devices and to the computing device 34 when power from the battery 76 is lost, particularly when the relay 82 is being switch between the first configuration and the second configuration.

Figure 8A:
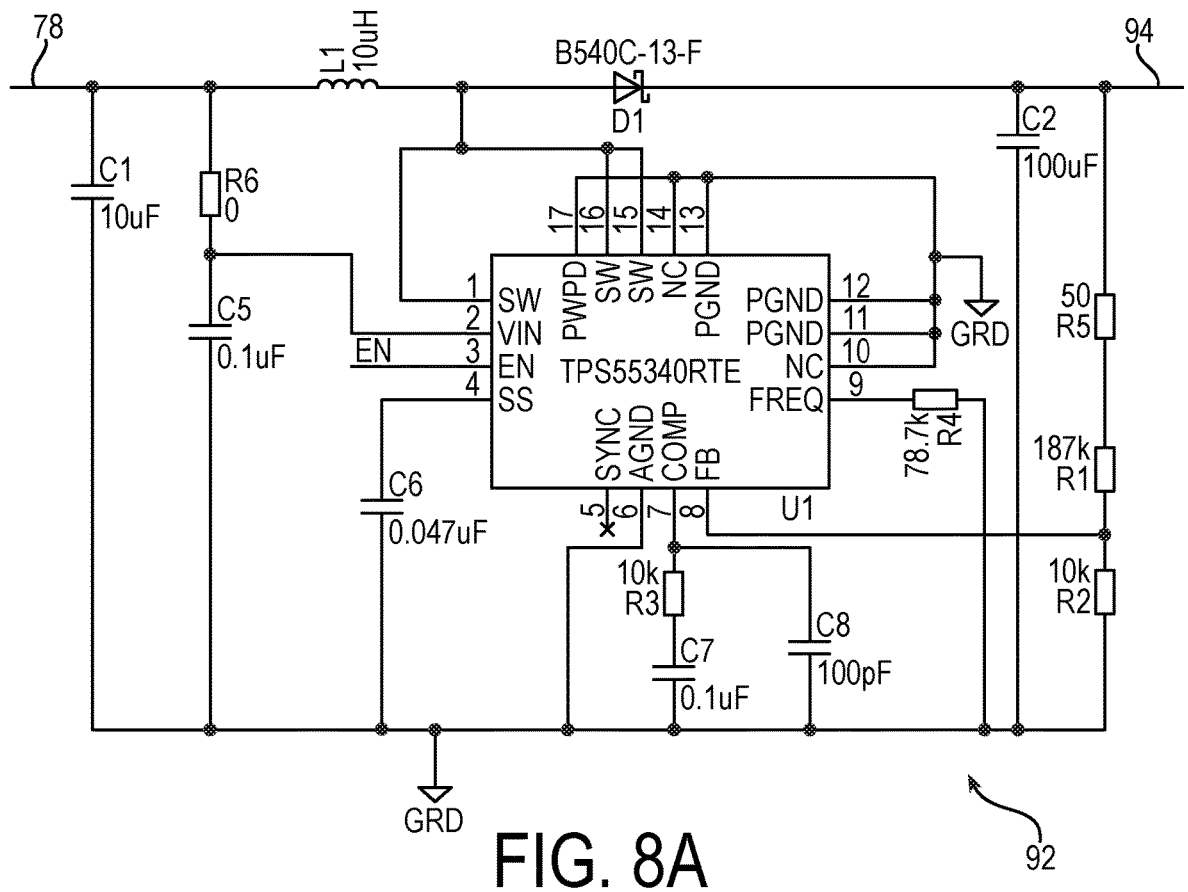
FIGS. 8A and 8B are a third circuit schematic of a third portion of the electrical system of the exemplary modular ATM.
Figure 8B:
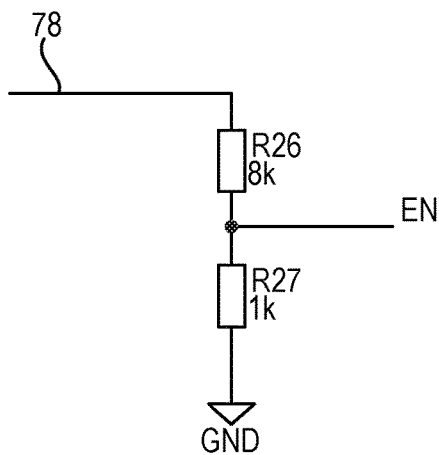
Figure 9:
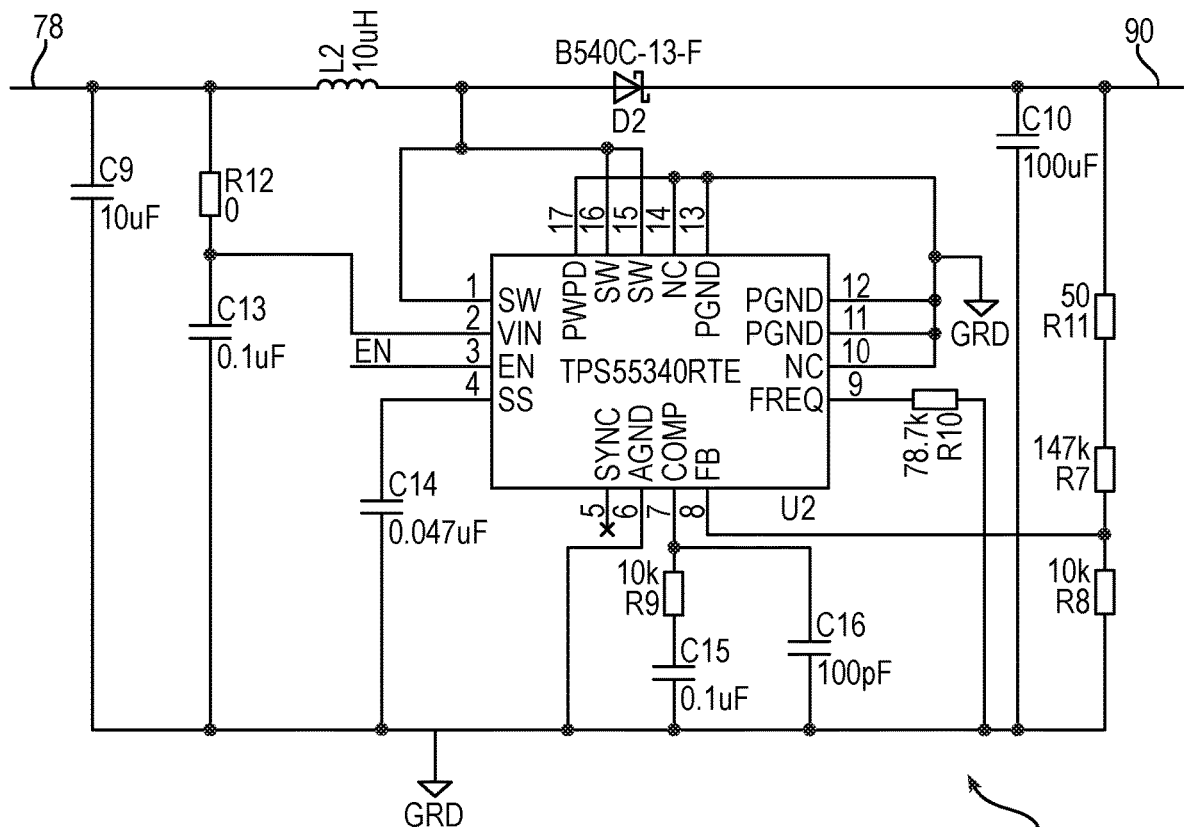
FIG. 9 is a fourth circuit schematic of a fourth portion of the electrical system of the exemplary modular ATM.
Figure 10:
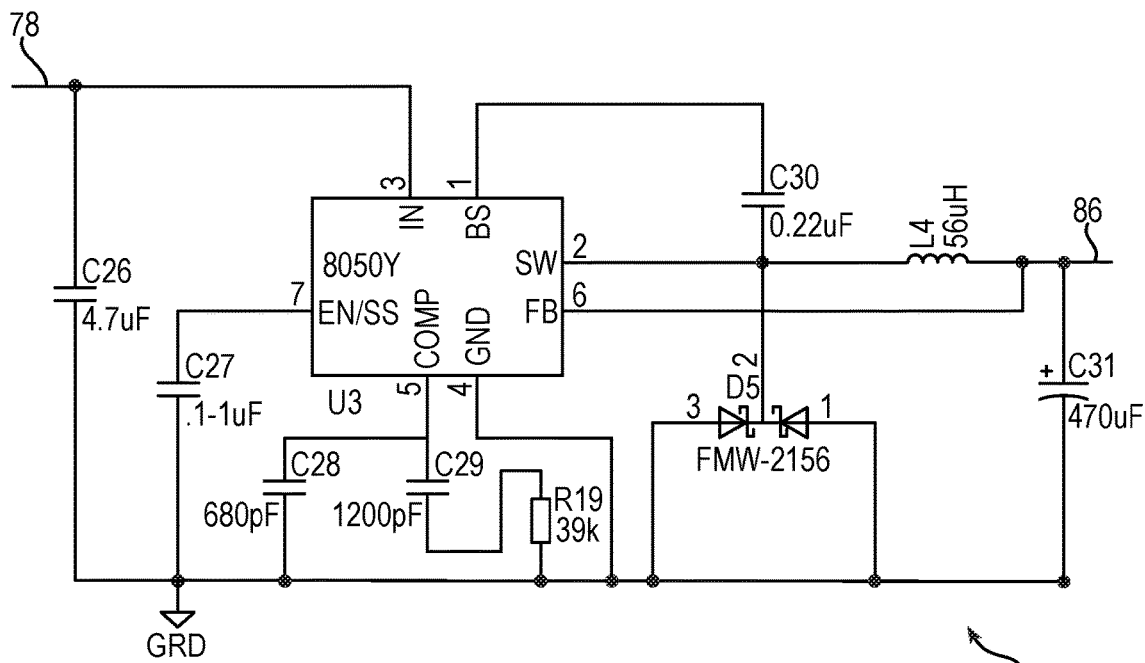
FIG. 10 is a fifth circuit schematic of a fifth portion of the electrical system of the exemplary modular ATM.

In the exemplary embodiment of the present disclosure, various subsystems and components within the head portion 12 require different amounts of power. An exemplary circuit assembly 84 is connected to the rail 78, converts the first level of voltage on the first rail 78 to a second level of voltage different from the first level of voltage, and communicates and outputs 5 VDC to a rail 86. The exemplary circuit assembly 84 is shown in FIG. 10. In the exemplary embodiment, the exemplary light 43 receives power off of the first rail 78. An exemplary circuit assembly 88 is connected to the rail 78, converts the first level of voltage on the first rail 78 to a third level of voltage different from the first level of voltage, and communicates and outputs 19 VDC to a rail 90. The exemplary circuit assembly 88 is shown in FIG. 9. In the exemplary embodiment, the computing device 34 receives power off of the rail 90. An exemplary circuit assembly 92 is connected to the rail 78, converts the first level of voltage on the first rail 78 to a fourth level of voltage different from the first level of voltage, and communicates and outputs 24 VDC to a rail 94. The exemplary circuit assembly 92 is shown in FIGS. 8A and 8B. In the exemplary embodiment, the card reader 46, the transceiver 62, and EPP receive power off of the rail 94.

It is noted that embodiments of the present disclosure may include less than four rails or more than four rails, may include rails at different voltage levels, and/or may include multiple rails of the same voltage level if desired. In the exemplary embodiment, three 24 VDC rails are established. Two of the 24 VDC rails are used to power peripherals/modules/devices and one 24 VDC rail is used to power the battery charging circuitry. The charger rail is not enabled unless the 12 VDC rail 78 is powered from the base portion 14. The reason for multiple 24 VDC rails to power peripherals/modules/devices in the exemplary embodiment is that only so much power can be directed through the DC-DC converter logic.

Figure 6:
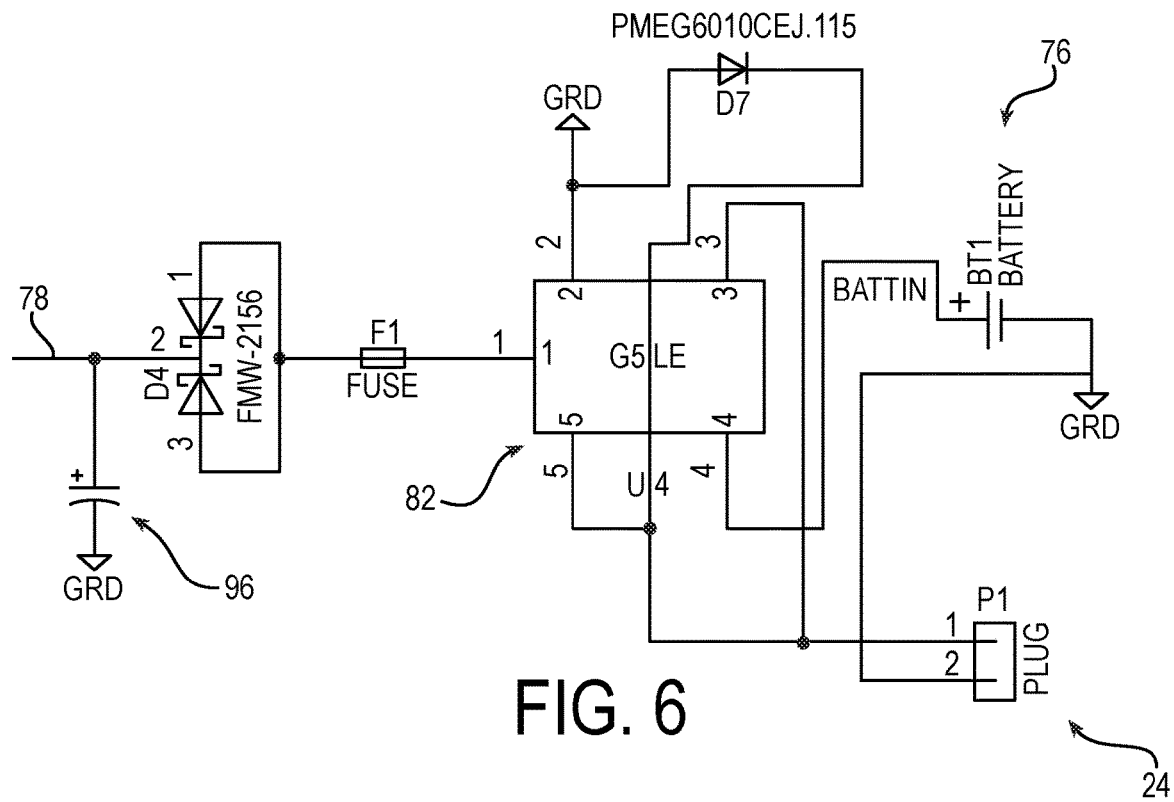
FIG. 6 is a first circuit schematic of a first portion of an electrical system of the exemplary modular ATM.
Figure 7A:
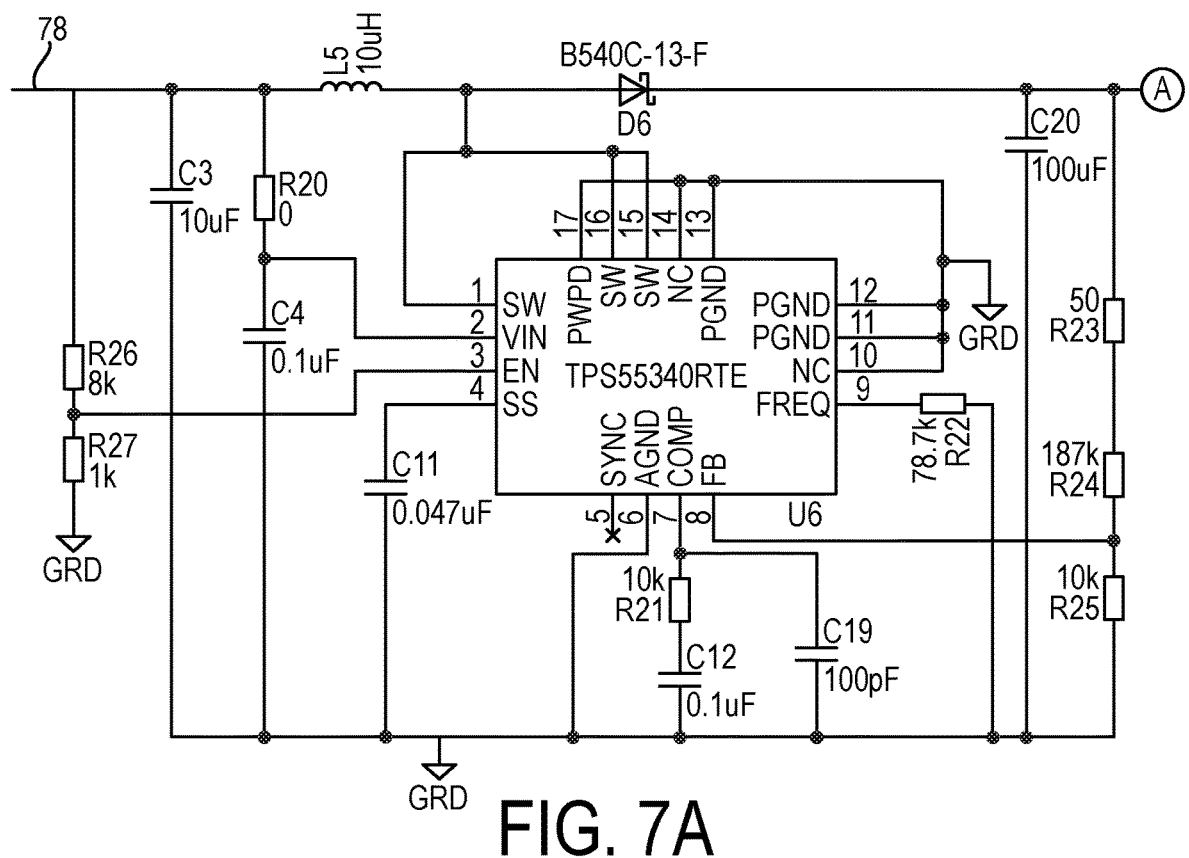
FIGS. 7A-7C are portions of a second circuit schematic of a second portion of the electrical system of the exemplary modular ATM, the second portion being a battery charging circuit.
Figures 7B, 7C:
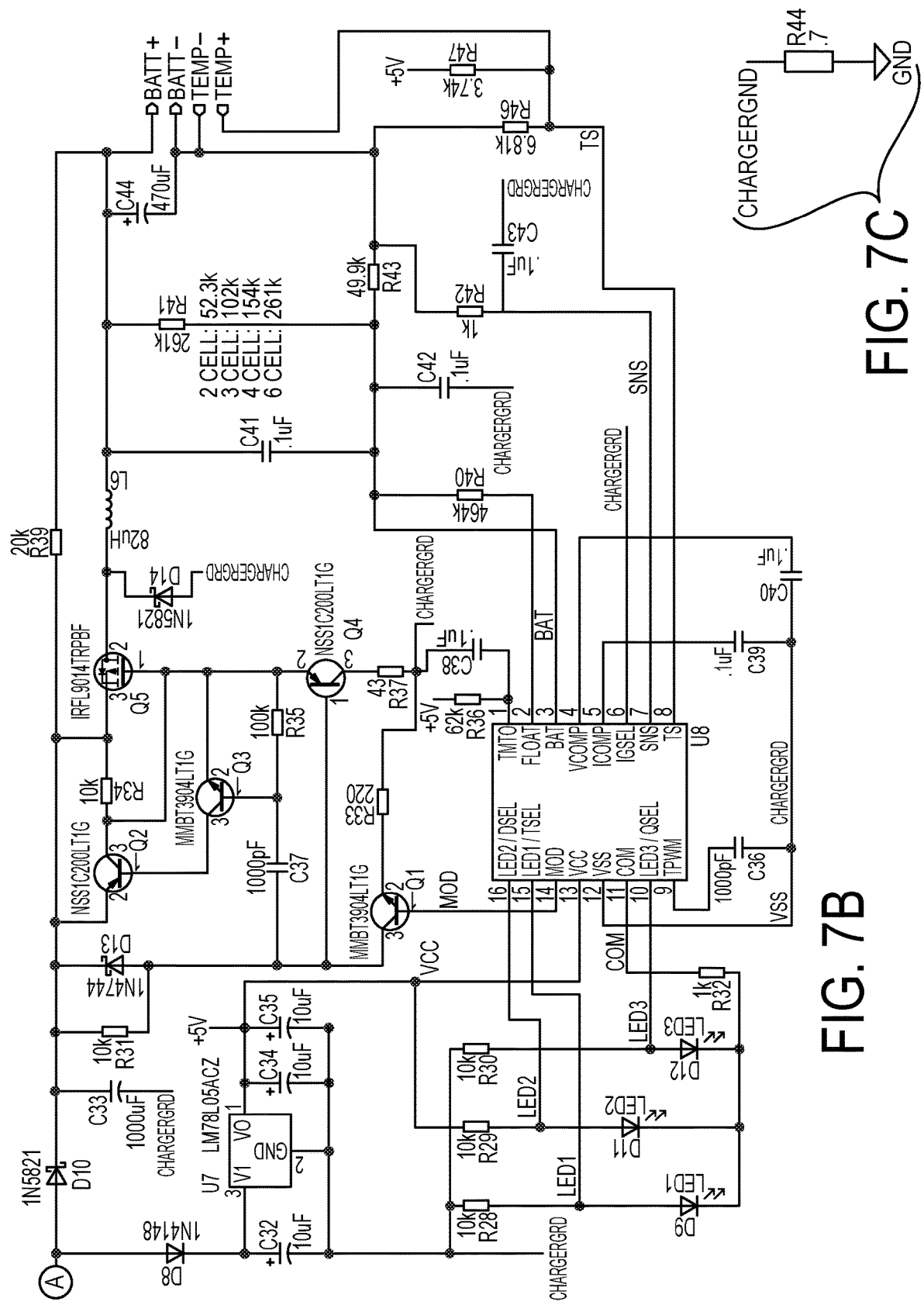

FIG. 6 is a first circuit schematic of a first portion of an electrical system of the exemplary modular ATM 10. It is noted that any particular value of components shown in the Figures or particular part numbers of components shown in the Figures are exemplary; the present disclosure is not limited to such values and such part numbers. The exemplary first portion shows the power input portion of the head portion 12. FIGS. 7A-7C are portions of a second circuit schematic of a second portion of the electrical system of the exemplary modular ATM 10. The exemplary second portion is a battery charging circuit. FIGS. 8A and 8B are portions of a third circuit schematic of a third portion of the electrical system of the exemplary modular ATM 10. The exemplary third portion is the circuit assembly 92, for outputting 24 VDC to the rail 94. FIG. 9 is a fourth circuit schematic of a fourth portion of the electrical system of the exemplary modular ATM 10. The exemplary fourth portion is the circuit assembly 88, for outputting 19 VDC to a rail 90. It is noted that "EN" shown in FIG. 9 is further explained in FIG. 8B. FIG. 10 is a fifth circuit schematic of a fifth portion of the electrical system of the exemplary modular ATM 10. The exemplary fourth portion is the circuit assembly 84, for outputting 5 VDC to a rail 86.

In operation, the user-interface devices of the exemplary modular ATM 10 are configured to receive an input from a user. The exemplary modular ATM 10 includes a plurality of user-interface devices which can be used individually by the user or in groups of two or more. The exemplary modular ATM 10 includes the key pad 40, the display 38, the scanner 70, the NFC transceiver 62, and the card reader 46. For example, the user may use only the NFC transceiver 62 when directing the input to the exemplary modular ATM 10. Alternatively, the input can be data received from more than one user-interface device. For example, the user may use the key pad 40, display 38, and the card reader 46 when providing the input to the exemplary modular ATM 10.

The input corresponds at least in part to an account maintained by a financial institution. For example, the input can be a scan of a QR code that was generated by a financial institution and transmitted to a smartphone of a user. The user can present the QR code in front of the scanner 70 to provide the input. The QR code can correspond to the user's account with the financial institution and an amount to be dispensed (as part of a pre-staged transaction). In another example, the input can be the data contained in a chip in a card, which includes the user's account number.

Figure 11:
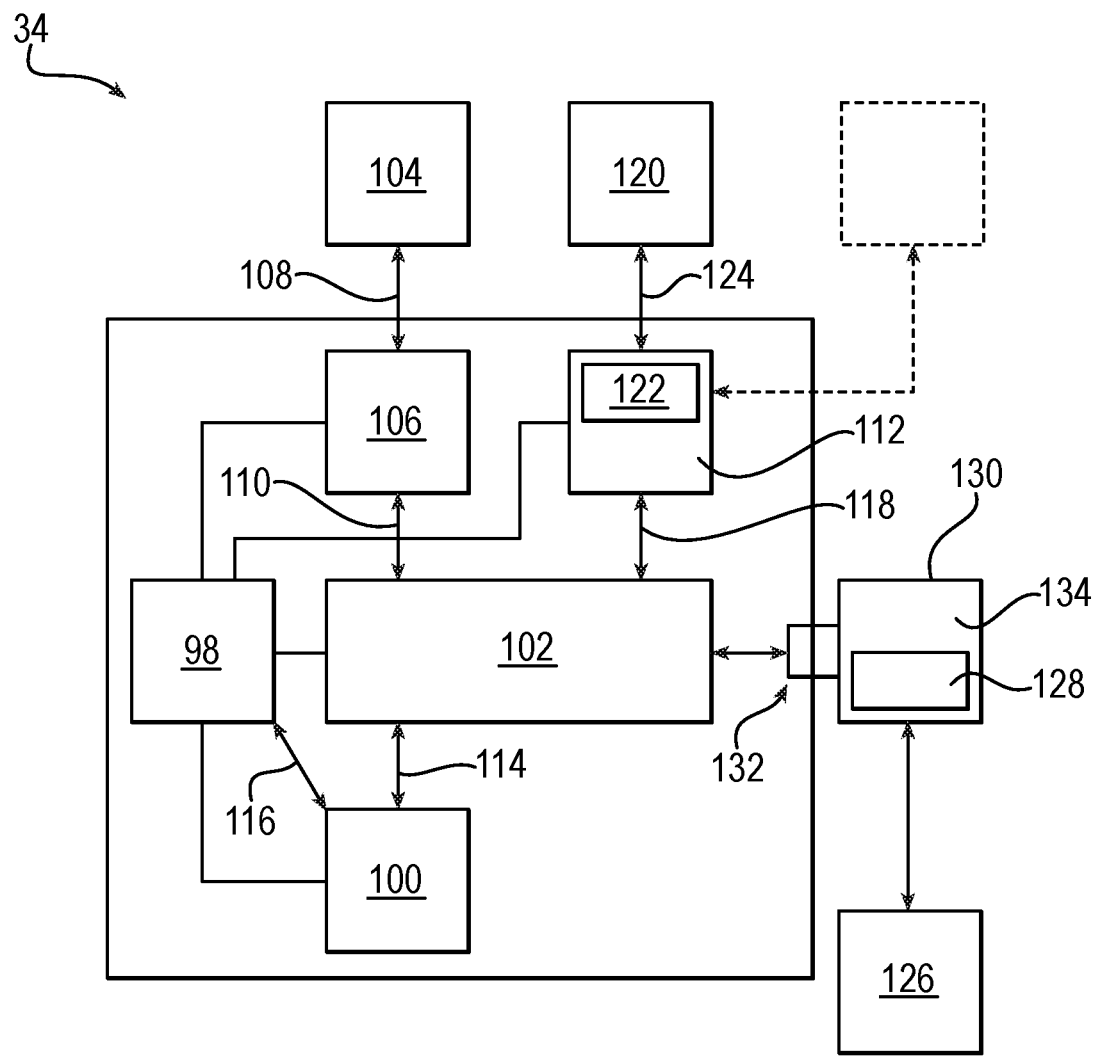
FIG. 11 is a schematic of a control architecture of the exemplary modular ATM.

FIG. 11 is a schematic of a control architecture of the exemplary modular ATM 10. The exemplary modular ATM 10 applies a publish/subscribe protocol in controlling at least some of its functions and operations. In the exemplary embodiment of the present disclosure, the computing device 34 can be one or more processors. Reference number 98 is utilized to reference processing operations for the overall functionality of the exemplary modular ATM 10. Processor 98 can be part of the computing device 34 or can be running on the computing device 34, and can itself run a terminal service. An exemplary terminal service referenced at 100. A service, such as the terminal service, can be provided through hardware, software, or a combination of hardware and software. A service can receive data from a component or device or peripheral or subsystem of the exemplary modular ATM 10. A service can also generate a message containing the received data, wherein the data can be received in one format and the message is in another format. Any particular component or device or peripheral or subsystem of the exemplary modular ATM 10 can communicate data to a corresponding service and the service can communicate a message containing the data in JSON format and according to the MQTT protocol. Further, the service can define a topic of the message and the topic of the message is contained within the message. A topic can itself be defined by one or more topic levels. The service can direct the message, defined by one or more topic levels, to a broker 102. The broker can publish the message to other service(s) that have subscribed to the topic of the message. Thus, a service can also subscribe to messages defined by particular topics.

The exemplary terminal service 100 is running on the processor 98 and can be configured to subscribe to messages defined by particular topics. Topics can be defined in part by the device from which a message originates (as will be described in greater detail below). The broker 102 receives all messages and publishes the messages to services that have subscribed to the topic associated with each message. Thus, the services do not directly communicate with one another. In the exemplary embodiment, the broker 102 can be the Eclipse Mosquitto™ broker (see https://mosquitto.org/). The terminal service 100 can be subscribed to all topics and will therefore receive all messages published by the broker 102, other than messages emanating from the terminal service 100 itself. Messages received by the terminal service 100 can be directed to the processor 98 for processing according to logic stored in memory 36.

The exemplary broker 102 is a secondary service running on the processor 98 of the computing device 34. The term "secondary" is applied to distinguish the broker 102 from other services based on generally functionality and not on importance. For example, unlike a service that may receive data in a first format or protocol and transmit the data in a different format or protocol, the broker 102 receives and transmits messages in the same format or protocol. Further, the broker 102 filters messages and publishes messages to the appropriate services.

In one exemplary operating scenario, a user can insert a bank card into a card reader, such as card reader 46. In FIG. 11, reference number 104 is utilized as a generic user-interface device. In this example, box 104 corresponds to the card reader 46. The user-interface device 104 in the form of the card reader 46 is configured to transmit the input (card data) to the broker 102.

The exemplary processor 98 is also running a user-interface service, referenced at 106. In this example, the input (card data) is first transmitted by the user-interface 104 to the user-interface service 106. Communication between the user-interface device 104 and the user-interface service 106 is referenced at 108. The input (card data) can be first transmitted to the user-interface service 106. The user-interface service 106 can convert the input (card data) to a different format. For example, the user-interface service 106 can convert the input (card data) to JSON format in MQTT protocol. The user-interface service 106 can then transmit the input (card data), in JSON format and in MQTT protocol, to the broker 102. Communication between the user-interface service 106 and the broker 102 is referenced at 110. The communication from the user-interface service 106 can designate a topic (with one or more topic levels) for the message to be published by the broker 102.

The broker 102 is configured to publish the received data input as a first message. The first message will be in JSON format and in MQTT protocol. One or more other services may be subscribed to the topic of the data input and thus receive the first message. In the exemplary embodiment, the terminal service 100 has subscribed, with the broker 102, to the topic associated with the data contained in the communication from the user-interface service 106. Communication between the terminal service 100 and the broker 102 is referenced at 114. The terminal service 100 and the user-interface service 106 are isolated from one another with respect to direct communications; the exemplary terminal service 100 and the exemplary user-interface service 106 do not communicate directly with one another.

The terminal service 100 is configured to receive the first message from the broker 102 and transmit the content of the first message to the processor 98. Communication between the terminal service 100 and the processor 98 is referenced at 116. The terminal service 100 is configured to transmit the content of the first message to the processor 98 for processing according to logic stored in memory 36. For example, processor 98 can determine one or more commands to transmit in response to receipt of the content of the first message. For example, the processor 98 may transmit the data contained in the first message outside of the modular ATM 10 for validation/approval. In another example, the processor 98 may issue a command to the display 38 to display a message for the user to enter a PIN. The terminal service 100 is configured to convert the format of the first message from JSON format and MQTT protocol to another format/protocol before transmitting to the processor 98, if necessary.

In response to receiving the first message, in this continuing example, the processor 98 can determine that banknotes should be dispensed to the user. In FIG. 11, reference number 120 is utilized as a generic output device. In this example, box 120 corresponds to the AFD 64. The exemplary processor 98 can direct an appropriate command to the terminal service 100. The terminal service 100 can convert the command to a different format if necessary. For example, the terminal service 100 can convert the command to JSON format in MQTT protocol. The terminal service 100 can then transmit the command, in JSON format in MQTT protocol, to the broker 102. The communication from the terminal service 100 can designate a topic (with one or more topic levels) for the message to be published by the broker 102.

The broker 102 can publish a second message containing the command. The topic of the second message can include, as a topic level, "AFD" for example. The exemplary processor 98 of the computing device 34 is also running an AFD service, referenced at 112. The AFD service 112 can be subscribed to messages that contain commands for the AFD 64 and thus receive the second message, in JSON format and MQTT protocol, from the broker 102. Communication between the AFD service 112 and the broker 102 is referenced at 118.

The AFD service 112 can convert the command to a different format if desired. For example, the AFD service 112 can convert the command from the JSON format and/or MQTT protocol. The AFD service 112 can then transmit the command to the output device 120 (the AFD 64 in this example) for execution of the command. The exemplary AFD service 112 is illustrated with a bus-based messaging protocol, referenced at 122. In one or more embodiments of the present disclosure, output devices and/or user-interface devices can be configured to receive and transmit communications under a common protocol that may be different from the protocol of the services and the broker 102. Lightweight Application Communication Bus (LACB) and Extensions for Financial Services (XFS) Service Provider are two examples of such protocols. A service may include a bus applying these protocols so that a single service can communicate with more than one device. FIG. 11 shows AFD service 112 configured to communicate with a second device (in phantom) other than the box 120 using the bus-based messaging protocol 122.

The AFD service 112 can communicate the command to output device 120 (the AFD 64 in this example). Communication between the AFD service 112 and the output device 120 is referenced at 124. The AFD 64 dispenses banknotes in response to the second message.

The communication architecture disclosed above allows subcomponents of the exemplary modular ATM 10 to be replaced with greater ease. In the exemplary embodiment of the present disclosure, all of the components of the modular ATM 10 can apply the architecture. The user-interface device 104 could be the scanner 70 and the processor 98 could be running a scanner service. The display 38 could be a user-interface device 104 or an output device 120 and the processor 98 could be running a display service. The user-interface device 104 could be the encrypting key pad 40 and messages containing the encrypted PIN can be transmitted in JSON format and in MQTT protocol.

In the example above, the initial sequence began based on an input from a user. However, the communication architecture can also be applied for diagnostic data. The various devices of the modular ATM 10 can include diagnostic sensors to alert the computing device 34 of problems and/or confirm operating status. For example, the exemplary AFD 64 is configured to transmit diagnostic data to the broker 102 through the AFD service 112 and the broker 102 is configured to transmit messages to the terminal service 100 containing the diagnostic data.

In one or more implementations of the present disclosure, one or more of the devices can respond to the receipt of a message by publishing a message. In one example, the AFD 64 can confirm that banknotes have been dispensed by publishing a message that will be received by the processor 98. In one or more implementations of the present disclosure, one or more of the services associated with a particular device can subscribe to messages published by a service other than the terminal service 100. In one example, the AFD 64 can subscribe to messages published by the encrypting key pad 40. Upon receipt of a message to dispense banknotes, the AFD 64 can first confirm receipt of a message published previously by the encrypting key pad 40, before executing a command to dispense bank notes. This feature can inhibit the perpetration of fraudulent activity, such as jackpotting.

FIG. 11 shows another feature of one or more implementations of the present disclosure. A peripheral 126 is mounted in the housing defined by the head portion 12 and the base portion 14. The peripheral 126 can be configured to perform an action and is in communication with the broker 102. In one example, the peripheral 126 can be the article exchange unit 50. Further, the article exchange unit 50 can be a recycler that operates through an XFS Service Provider, referenced at 128. A microprocessor chip 130 can be interconnected with the computing device 34 through a physical socket pair 132. The exemplary microprocessor chip 130 is interconnected with the peripheral 126 and is running a peripheral service 134 configured to bridge communications between the XFS Service Provider 128 and the broker 102. The peripheral service 134 running on the microprocessor chip 130 is configured to convert messages received from the broker 102 to XFS format so that modification of the programming of the peripheral 126 is not required for the peripheral to be utilized in the modular ATM 10.

In one or more implementations of the present disclosure, each device can be operating its respective service on its own processor. In the FIG. 11, the recycler is shown operating on its own compute platform (the microprocessor chip 130). But embodiments of the present disclosure can be practiced wherein each device (AFD 64, NFC transceiver 62, card reader 46, encrypting key pad 40, etc.) is on a separate compute platform and communicating with a broker 102 over network connections.

The computing device 34 is configured to transmit content of a message received from the broker 102 outside of the exemplary modular ATM 10. The terminal service 100 can convert a format of the second message from a first protocol to a second protocol prior in order for the processor 98 to transmit the content of the second message outside of the exemplary modular ATM 10 if necessary.

In an exemplary method of operating the ATM 10, the head portion 12 can be lowered onto the base portion 14. The head portion 12 can come to rest and be positioned on the shelf 16 of the base portion 12. The head portion can then be slide across the shelf 16 until the first socket-half 24 mates with the second socket-half 26. The exemplary ATM 10 thus applies a single indent connection, defined by the first socket-half 24. Further, the exemplary ATM 10 thus applies push pin connectors in the socket-halves 24, 26. No holes are formed in the safe 66, as holes in a safe leave more attack vectors to get the banknotes within the safe. Further, as visible in the Figures, the socket-halves 24, 26 are shaped to define an angled connection to aid in aligning the head portion 12 with the base portion 14. The overall shape of the head portion 12 and base portion 14 define a "keyed" arrangement so that the two could not be engaged backwards.

During the lowering, positioning, and sliding, the first level of voltage on the first electrical rail 78 can be maintaining with the battery 76. By keeping the power on to all devices, the time elapsing between the lowering of the head portion 12 onto the base portion 14 and the performance of a transaction with the ATM 10 is minimized. For example, if all power were lost every time the head portion 12 is removed/replaced power, all of the subcomponents of the ATM 10 would need to reboot and initialize once the head portion 12 is redocked with the base portion 14. This could take five to ten minutes. However, in the exemplary embodiment, setting up a network link between the computing device 34 and the AFD 64 is required and exchanging a few messages is all that is required before the ATM 10 is operational. This will take thirty to sixty seconds.

After the head portion 12 and base portion 14 are connected through the socket-halves 24, 26, the computing device 34 and the AFD 64 are placed in communication with one another wherein communications between the computing device and the AFD occur by way of a publish/subscribe protocol as described above. This further reduces the time that must elapse between the lowering of the head portion 12 onto the base portion 14 and the performance of a transaction with the ATM 10. For example, the computing device 34 and the AFD 64 are not required to authenticate one another. As set forth above, the computing device 34 can run the AFD service 112 for the AFD 64 which further reduces the time that must elapse between the lowering of the head portion 12 onto the base portion 14 and the performance of a transaction with the ATM 10. For example, the AFD service 112 prevents communications between the computing device 34 and the AFD 64 being slowed or prevented by differences in the respective models of the computing device 34 and the AFD 64.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed.

What is claimed is:

1. An automated transaction machine (ATM) comprising:
   at least one user-interface device configured to receive an input from a user, wherein the input corresponds at least in part to an account maintained by a financial institution, and wherein said at least one user-interface device is configured to transmit the input, wherein said at least one user-interface device is further defined as one of a key pad, a display, a scanner, a near field communication (NFC) transceiver, and a card reader;
   at least one computing device in data communication with said at least one user-interface device to receive the input;
   a battery selectively connectable to said at least one user-interface device and to said at least one computing device to direct electric power when connected to said at least one user-interface device and to said at least one computing device;
   a head portion wherein said at least one user-interface device and said at least one computing device and said battery are housed in said head portion;
   a first socket-half fixedly mounted in said head portion, exposed on an outside surface of said head portion, and electrically connected to said at least one user-interface device and to said at least one computing device and to said battery to direct electric power, when connected to said at least one user-interface device and to said at least one computing device and to said battery;
   a first electrical rail housed in said head portion, wherein said at least one user-interface device receives power off of said first electrical rail;
   a relay communicating with said first socket-half and also disposed between said battery and said first electrical rail, wherein said relay is arranged such that said relay connects said battery and said first electrical rail in a first configuration and in a second configuration selectively switches said battery off of said first electrical rail, and wherein said relay is switched between said first configuration and said second configuration by an output signal of said first socket-half;
   a base portion selectively engageable with said head portion and defining an output slot, wherein said head portion rests on said base portion when said base portion and said head portion are engaged together;
   a safe housed in said base portion;
   an advanced function dispenser (AFD) housed in said base portion and configured to extract banknotes from said safe and direct the banknotes through said output slot
   a second socket-half fixedly mounted in said base portion, wherein said first socket-half and said second socket-half directly mate as said base portion and said head portion are brought into engagement with one another; and
   a power management module housed in said base portion and configured to receive grid electrical power from the grid, direct grid electrical power through said base portion, convert grid electrical power from AC to DC, and direct DC power to said head portion through said first socket-half and second socket-half.

2. The ATM of claim 1 further comprising:
   a battery charger circuit disposed between said relay and said first socket-half, wherein said battery charger circuit is connected to said battery when said relay is in said second configuration.

3. The ATM of claim 2 wherein said first socket-half is directly connected to said first electrical rail.

4. The ATM of claim 3 wherein said first socket-half is directly connected to said battery charger circuit as well as said relay.

5. The ATM of claim 4 further comprising:
   a second electrical rail housed in said head portion; and
   a first circuit assembly housed in said head portion and disposed between said first electrical rail and said second electrical rail, said first circuit assembly converting a first level of voltage on said first electrical rail to a second level of voltage different from the first level of voltage and communicating the second level of voltage to said second electrical rail.

6. The ATM of claim 5 wherein the first level of voltage is less than the second level of voltage.

7. The ATM of claim 6 further comprising:
   a third electrical rail housed in said head portion; and
   a second circuit assembly housed in said head portion and disposed between said first electrical rail and said third electrical rail, said second circuit assembly converting the first level of voltage on said first electrical rail to a third level of voltage different from the first level of voltage and communicating the third level of voltage to said third electrical rail.

8. The ATM of claim 7 wherein the first level of voltage is greater than the third level of voltage.

9. The ATM of claim 8 further comprising:

a capacitor housed in said head portion connected to said first electrical rail and configured to direct electrical power to said first electrical rail when power from either of said battery or said first socket-half is lost.

10. The ATM of claim 1 wherein said AFD communicates data with said at least one computing device through said first socket-half and said second socket-half.

11. The ATM of claim 1 wherein said first socket-half and said second socket-half are configured to transmit power and data between said base portion and said head portion.

12. The ATM of claim 11 wherein said base portion is configured to receive power from the grid and direct power to the head portion through said first socket-half and second socket-half.

13. The ATM of claim 12 wherein said base portion defines a shelf sized to receive a bottom of said head portion, said head portion rests on said shelf when said first socket-half and said second socket-half are mated, wherein at least one post projects away from said shelf and is received in at least one slot defined in said bottom of said head portion when said head portion is placed on said shelf, and wherein said head portion is configured to be moved deeper into said shelf, towards a back wall of said shelf, while said at least one post is positioned in said at least one slot.

14. The ATM of claim 13 wherein said first socket-half is mounted in said head portion and faces said back wall of said base portion and is moved deeper into said shelf, said second socket-half is mounted in said back wall, and wherein said first socket-half and said second socket-half directly mate when movement of said head portion deeper into said shelf is stopped by engagement between said at least one post and said at least one slot, precluding damage to said first socket-half and said second socket-half by preventing over-engagement between said first socket-half and said second socket-half.

15. The ATM of claim 14 further comprising:
one or more blades extending from said head portion;
one or more slots defined in said back wall of said base portion, each of said one or more slots configured to receive said one or more blades; and
one or more locks mounted in said base portion, each of said one or more locks configured to receive a key to convert from an unlocked configuration to a locked configuration, and from the locked configuration to the unlocked configuration, wherein said one or more blades is received in said one or more slots when said head portion is moved deeper into said shelf, against said back wall, and wherein after said one or more blades is received in said one or more slots, said one or more locks can be engaged to lock said one or more blades in said one or more slots.

16. A method of operating the ATM of claim 14 comprising:
lowering the head portion onto the base portion;
positioning the head portion on the shelf of the base portion; and
sliding the head portion across the shelf until the first socket-half directly mates with the second socket-half.

17. The method of claim 16 further comprising:
maintaining the first level of voltage on the first electrical rail with the battery during said lowering and said positioning and said sliding.

18. The method of claim 17 further comprising:
placing, after said sliding, the computing device and the AFD in communication with one another through the mated first and second socket-halves and wherein communications between the computing device and the AFD occur by way of a publish/subscribe protocol.

19. The method of claim 18 further comprising:
running, on the computing device, a terminal service for the AFD wherein the terminal service can receive data from the AFD after said placing and can also generate a message containing the received data, wherein a format of the received data is changed by the terminal service to the publish/subscribe protocol.

* * * * *